US008213718B2

(12) United States Patent
Mayoral et al.

(10) Patent No.: US 8,213,718 B2
(45) Date of Patent: Jul. 3, 2012

(54) METHOD FOR VIDEO MODE DETECTION

(75) Inventors: Sergio Mayoral, Stuttgart (DE); Oliver Erdler, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 1292 days.

(21) Appl. No.: 11/689,758

(22) Filed: Mar. 22, 2007

(65) Prior Publication Data

US 2007/0263123 A1 Nov. 15, 2007

(30) Foreign Application Priority Data

Mar. 29, 2006 (EP) .................................... 06006560

(51) Int. Cl.
*G06K 9/34* (2006.01)

(52) U.S. Cl. ........ 382/176; 382/173; 382/178; 382/180; 348/558; 348/441; 348/465; 348/467

(58) Field of Classification Search .................. 348/558, 348/465, 467, 441–459; 382/192–231, 176
See application file for complete search history.

(56) References Cited

U.S. PATENT DOCUMENTS

| 2004/0078814 | A1* | 4/2004 | Allen | 725/47 |
| 2005/0243216 | A1* | 11/2005 | Salzer et al. | 348/701 |
| 2005/0253964 | A1* | 11/2005 | Janssen et al. | 348/459 |
| 2007/0040935 | A1* | 2/2007 | Lee et al. | 348/452 |

FOREIGN PATENT DOCUMENTS

| EP | 1 198 139 A1 | 4/2002 |
| EP | 1 404 130 A1 | 3/2004 |
| EP | 1 544 836 A1 | 6/2005 |
| EP | 1 592 246 A1 | 11/2005 |
| EP | 1 592 251 A1 | 11/2005 |
| EP | 1592246 A1 * | 11/2005 |

* cited by examiner

*Primary Examiner* — Jefferey Harold
*Assistant Examiner* — Omer Khalid
(74) *Attorney, Agent, or Firm* — Oblon, Spivak, McClelland, Maier & Neustadt, L.L.P.

(57) ABSTRACT

A method for video mode detection, wherein video input data (VID) corresponding to a video picture (P) is received and a video mode is determined for said video picture (P). The determining of said video mode depends on a local video mode (LVM) and a global video mode (GVM) of said video picture (P). Said global video mode (GVM) is determined for said video picture (P) based on said video input data (VID) or a derivative ($m_1$) thereof. For determining said local video mode (LVM), first said video picture (P) is subdivided into a ticker area (TA) and a remaining area (RA), thereby generating ticker area data (TAD). Then, said local video mode (LVM) is determined for said ticker area (TA) based on said ticker area data (TAD). When determining said local video mode (LVM), said ticker area (TA) is subdivided into n sub-areas, and at least one of said n sub-areas (1 . . . 6) is selected as selected sub-area (SSA). Further, a sub-area video mode (SVM) is determined for said selected sub-area and said local video mode (LVM) is determined for said ticker area (TA) based on said sub-area video mode (SVM).

28 Claims, 7 Drawing Sheets

METHOD FOR VIDEO MODE DETECTION

DESCRIPTION

The invention relates to a method for video mode detection, and to a method for motion compensated up-conversion, in particular applying said method for video mode detection.

There are a number of areas in video processing, where it is important to detect the video mode of video input data precisely and robust. An important field of video processing, where it is necessary to detect the video mode correctly, is motion compensated up-conversion. Within the area of motion compensated up-conversion, it is for example the goal to raise the picture or field frequency from e.g. 50 Hz to e.g. 100 Hz.

Generally, there are two different video modes: film mode and camera mode. In camera mode there are generally 50 pictures per second, i.e. the video signal or video input data has 50 Hz. In camera mode, the video picture has been generated with 50 Hz, therefore, there is motion between each consecutive picture, field or frame. This means, in camera mode, the frequency of phases of motion is 50 Hz. Contrary, in film mode, in each second field there is no motion. This means, the frequency of phases of motion in film mode is equal to 25 Hz.

It may be difficult to correctly detect the video mode, where a news ticker or running title is blended into the video picture by the broadcaster. Such a ticker or running title is generally blended in in camera mode. However, if the rest of the video picture is in film mode, the running title or ticker will be rendered or viewed very badly. Since the user or viewer will focus on the running title to read e. g news, or the like, the up-conversion process, e.g. the motion compensated algorithm should in this case switch to camera mode in order to render the titles without artifacts.

Prior art systems generally have difficulties to detect e.g. a ticker that is blended in in camera mode, wherein the background picture or remaining picture is in film mode. With prior art systems such a mixture of modes within the video picture may cause the system to switch randomly between film mode and camera mode. For the viewer, this means that the quality of the picture changes randomly and constantly.

Also, when a ticker that is blended in in camera mode, appears on a video picture that is broadcast in film mode, the system or TV set, or the like should switch to camera mode very quickly, such that the user may view the picture without any artifacts and is able to read the ticker clearly from the moment the ticker appears on the screen, i.e. within the video picture.

The detection process may be very slow, i.e. it takes a long time for the system to switch from film mode to camera mode when a running title or ticker appears on the screen. Therefore, the viewer may not be able to read the ticker from the beginning.

It is therefore an object underlying the invention to provide a method for video mode detection that enables to correctly determine a video mode for a video picture in a fast and robust manner. It is a further object of the invention to provide a method for motion compensated up-conversion that performs a correct motion compensated up-conversion for an input video picture at all times, in particular avoiding arbitrarily switching between film mode and camera mode. Further, it is an object of the invention to provide a signal processing means, a computer program product and a computer-readable storage medium that enable a correct video mode detection and motion compensated up-conversion for an input video picture.

To achieve this object, the invention provides a method for video mode detection and a method for motion compensated up-conversion according to claim 1, and 25, respectively. In addition, the invention provides a signal processing system, a computer program product and a computer-readable storage medium, as defined in claims 27, 28 and 29, respectively.

The method for video mode detection, comprises the following steps:
  determining a local video mode for a ticker area of a video input picture by
   subdividing said ticker area into n sub-areas, where n is an integer value and greater or equal to two,
   selecting at least one of said n sub-areas as selected sub-area, thereby generating sub-area data,
   determining a sub-area video mode for said selected sub-area based on said sub-area data or a derivative thereof,
   determining said local video mode for said ticker area based on said sub-area video mode.

Said ticker area is e.g. an area at the top of bottom of said input picture e.g. extending laterally across the whole width of said picture. In a ticker area information in the form of text may be displayed to a user e.g. information regarding stocks and bonds.

In an embodiment, the method for video detection may also comprise the steps of:
I: receiving video input data corresponding to a video picture,
II: analyzing said input video data, thereby
III: determining a video mode of said video picture, in particular to be used for an up-conversion of said video picture based on said video mode, wherein said video mode is determined depending on a local video mode and a global video mode of said video picture,
IV: outputting said video mode as output video mode,
wherein when analyzing said video input data in step II, the following steps are performed:
II.1: determining said global video mode for said video picture based on said video input data or a derivative thereof,
II.2: subdividing of said video picture into a ticker area and a remaining area, thereby generating ticker area data,
II.3: determining a local video mode for said ticker area based on said ticker area data,
wherein when determining said local video mode in step II.3, the following steps are performed:
II.3.1: subdividing said ticker area into n sub-areas, where n is an integer value and greater or equal to two,
II.3.2: selecting at least one of said n sub-areas as selected sub-area, thereby generating sub-area data, that correspond to video data of said selected sub-area,
II.3.3: determining a sub-area video mode for said selected sub-area based on said sub-area data or a derivative thereof,
II.3.4: determining said local video mode for said ticker area based on said sub-area video mode.

With respect to the above defined method, it is important to understand that said video input data can be a stream of video pictures, video frames and/or video fields. This means, within said method for video mode detection, consecutive video pictures/frames/fields are observed and a corresponding video mode, that can e.g. be camera mode or film mode, is determined and output. Said video input data thus has to be understood as a signal comprising previous video pictures and a current video picture. Within said method it is possible that said global video mode, said local video mode and/or said output video mode depend on a previous global video mode, a previous local video mode and/or a previous output video mode of a previous video picture, as will be explained in more detail below.

One idea of the invention is therefore to split said video picture into a ticker area and into a remaining area. Then, a local video mode or simply local mode is determined for said ticker area. Therefore, said ticker area is subdivided into different sub-areas and the video mode of at least one of said sub-areas is determined. Based on the video mode of one or more sub-areas, said local video mode is determined. The determined local video mode is then used to determine said output video mode. According to the invention, it is possible, that said output video mode is determined on the basis of said local video mode and said global video mode. Said global video mode is thereby determined for the whole video picture. In a preferred embodiment it is also possible that said global video mode is only determined for said remaining area. This means, in this case said output video mode depends on the local video mode of said ticker area and the video mode of said remaining area.

For a better understanding of the invention it could be helpful to understand the differences of the invention with respect to prior art as known from EP 1 198 139 A1.

The target of this prior art is to improve the efficiency and quality of a video encoding process. These measures depend on, if their encoding was done on frame basis, which is e.g. done for film mode source or on field basis, which is e.g. done for camera mode sequences. In order to differentiate these two cases, a method for film mode detection is proposed, which handles also the special case of mixed mode. Mixed mode means that most of the picture is consisting of film mode and a small part is portraying e.g. a running ticker in camera mode. It is stated that in such a case, it is preferred to switch the whole encoding process to camera mode and to perform a respective field based encoding process.

The film mode/ticker detection process is based on accumulated pixel differences between two adjacent fields. A first pixel difference is accumulated over the complete active picture area, a second pixel difference is accumulated over a second smaller region, e.g. in the lower of the picture. It is stated that this region is specified with parameters TS (Ticker Start) and TH (Ticker Height). This region stretches over the whole width of the picture, however, it could be also only over a part in horizontal direction. Both sums are added while the sum of the smaller part is weighted with a factor TW (Ticker Weight). The result of this addition is compared to a certain threshold in a single motion detection module, this results in a bit motion/no motion. A sequence of 40 motion bits is compared to specific patterns in order to determine the appropriate actual case. A number of some actual cases in favor of film or camera will lead the system to switch the mode.

Common between the invention and this prior art is the idea of detecting film, camera and mixed mode in order to improve the quality of the video processing system.

However, the invention concerns a different field of video processing, namely format conversion. The invention focuses especially on the improvement of the ticker detection process. The inventive method is completely different and is designed especially to achieve a high accurate detection process with low burden of computational cost. The inventive system/method can have two or even three subdivide processes for film mode detection in parallel, not one global one, which is based on a weighted sum of pixel differences. Further, the method can have a changing region of interest, which enables the process/method to track the running title over the screen and saves computational power on the same time. This is, because only said selected sub-area must be processed, i.e. the video mode of said selected sub-area must be determined. Further, the inventive method can have a special feature to detect a running title very early, when it appears on the screen at the right side. This is accomplished by reducing the region of interest to a small area on the right side. The inventive method is not specifically based on a pixel difference as is the case for the prior art document. In fact, a sum of motion vectors is used, which is accumulated in the region of interest instead of calculating a pixel difference. However, the inventive method could also be based on such a measure. The mode detection process itself is not specifically determined, instead the focus lies on how to apply such a process on a number of changing areas to cover the ticker problem highly accurate and robust.

In step II.2, it is possible that said selected sub-area is selected depending on a previous local video mode, which corresponds to the local video mode of a previous video picture of said video input data. This means, a previous local video mode is determined for a previous video picture of said video input data, corresponding to a stream of video pictures, and a new, i.e. different sub-area is selected for a current video picture depending on said previous local video mode. This means, the above defined steps I to IV with corresponding sub-steps II.1 to II.3, and II.3.1 to II.3.4 are executed for each of said video pictures of said stream of video pictures, and in particular for said current video picture.

Further in another embodiment, in step II.3.2, said selected sub-area is selected depending on a previous sub-area video mode, which corresponds to the sub-area video mode of a previous video picture of said video input data within said sub-area. Said previous sub-area video mode can correspond to any sub-area. However, the second sub-area may also be chosen or selected after the first sub-area depending on the previous video mode for the first sub-area. Further, the (n-1)-th sub-area is chosen or selected after the n-th sub-area depending on the previous video mode for the n-th sub-area. This means, the video mode may be determined for the first or n-th sub-area and subsequently the video mode is determined for the second/(n-1)-th sub-area.

In a further embodiment, the first sub-area and the n-th sub-area of said n sub-areas are chosen to be smaller than the remaining n-2 sub-areas, wherein said first sub-area is located on the right side of said ticker area and said n-th sub-area on the left side of said ticker area. When a sub-area is small, this means that there are more pixels with motion when compared to a larger area when a ticker is running through the small area. This means, the video mode may be detected more robust and faster than in a larger area. Within the inventive method, the first sub-area and the n-th sub-area are small so that a detection of a ticker entering or leaving the screen may be detected very fast and accurate. Also, a smaller area requires less processing power when the video mode is detected for this small area.

In a further embodiment, n is greater or equal to four and said first sub-area is completely contained in the second sub-area of said n sub-areas, and said n-th sub-area is completely contained in the (n-1)-th sub-area. In particular, n is, in a further embodiment, equal to six. Because said first sub-area is completely contained in the second sub-area, a video mode for said first sub-area is determined for a previous video picture and then, depending on the sub-area video mode for said first sub-area, said second sub-area is selected. Thus, at first i.e. for previous video pictures, a relatively small area is processed and then a larger area. This way, the processing power or CPU-time required for performing said method can be kept very low. While there is no ticker on the screen, the method only must observe the first and n-th sub-area which are very small and therefore, the processing power is very small. Also, because said first sub-area and said n-th sub-area are very small, there is a lot of motion within a small area when a ticker is running through the respective area, and therefore the detection of said ticker is very accurate and fast.

In a further embodiment, in step II.3.2, said first sub-area and said n-th sub-area are selected as selected sub-area, such that a ticker running through said video picture may be detected when just entering the video picture from the right side of said video picture and/or when leaving the picture on the left side of said video picture. As already mentioned, said first sub-area and said n-th sub-area are relatively small and therefore the processing power is very low. This means in particular, at times, when no ticker is on the screen, the needed processing power is very low.

In a further embodiment, said second sub-area is chosen as selected sub-area in case a previous first sub-area video mode for said first sub-area was equal to camera mode, wherein said previous first sub-area video mode corresponds to the sub-area video mode of a previous video picture within said first sub-area. In other words, said second sub-area is only processed in case the video mode for said first sub-area is equal to camera mode of a previous video picture. If this is the case, then the video mode is determined for said second sub-area.

If said first sub-area is equal to said selected area, i.e. the video mode was determined for a previous video picture, and said sub-area video mode was determined to be camera mode for said previous video picture, then said local video mode is chosen to be film mode. This means, although the video mode for said first sub-area is camera mode, the local video mode can stay in film mode. Then, subsequently said second sub-area is chosen to be said selected sub-area and a corresponding sub-area video mode is determined for a current video picture, wherein in case said corresponding sub-area video mode is equal to camera mode, said local mode is chosen to be camera mode, otherwise said local mode is chosen to be film mode. In other words, first the video mode is detected for the first sub-area and in case it is equal to camera mode, then the second sub-area is processed and the video mode for the second sub-area is detected, in case the video mode of said first sub-area was camera mode. Only if the video mode of said second sub-area is also camera mode, the local video mode is chosen to be camera mode. This way, the decision for the local video mode is more accurate, because the decision depends on the determined video mode for the first sub-area and for the second sub-area, which are determined subsequently. However, this embodiment may be seen as a trade-off between fast detection and robust detection, because it may take a longer time for a video mode detection, because two sub-areas must be processed. However, this is acceptable in case a very accurate decision about the local video mode is required.

A further embodiment is based on the same idea of subsequently processing the first and second sub-area, and concerns the subsequent processing of the (n-1)-th and the n-th sub-area. In this preferred embodiment the (n-1)-th sub-area is chosen as selected sub-area, in case a previous n-th sub-area video mode for said n-th sub-area was camera mode, wherein said previous n-th sub-area video mode corresponds to the sub-area video mode of a previous video picture within said n-th sub-area.

If the n-th sub-area is equal to said selected area and said sub-area video mode is determined to be camera mode, then said local video mode is chosen to be film mode, and subsequently, the (n-1)-th sub-area is chosen to be said selected area and a corresponding sub-area video mode is determined, wherein in case said corresponding sub-area video mode is equal to camera mode, said local mode is chosen to be camera mode, otherwise said local mode is chosen to be film mode. As can be seen, in this embodiment a similar approach as mentioned above is chosen, wherein the same idea is applied on the left side of the ticker area as on the right side of the ticker area, such that the (n-1)-th sub-area is treated like the second sub-area and the n-th sub-area is treated like the first sub-area. In both cases the underlying idea that first a small area on the right or left side of the ticker area is processed, and in case the video mode of this area is camera mode, then subsequently a larger area at the right or left side of the ticker area is processed. The right side concerns the entering of a ticker into the screen, and the left side corresponds to a leaving of the ticker area from the screen.

In a further embodiment, the second up to the (n-1)-th sub-areas are non-overlapping areas of said ticker area, and an m-th sub-area, where $2 \leq m \leq n$ is selected as said selected sub-area, if a previous (m-1)-th sub-area video mode for the (m-1)-th sub-area switches from camera mode to film mode, wherein said previous (m-1)-th sub-area video mode corresponds to the sub-area video mode of said (m-1)-th sub-area of a previous video picture. As explained above, said second sub-area may only be processed if the video mode or the first sub-area was determined to be camera mode. According to the method for video mode detection, the selected area remains to be the second sub-area, as long as the video mode of the second area is camera mode. In case the video mode of the second sub-area is not camera mode anymore, i.e. for example a ticker has left the second sub-area, the third sub-area is now selected as said selected sub-area and the above defined steps I to IV, II.1 to II.3, and II.3.1 to II.3.4 are executed for the third sub-area. This means, the area for determining said sub-area video mode is moved from the right side of said ticker area to the left side. This way it is always ensured that only a relatively small region must be processed, i.e. the video mode for a relatively small sub-area must only be determined. Again this means that a robust, fast and accurate detection of the video mode for a respective sub-area is possible. In the above example, after the video mode of the third sub-area switches from camera mode to film mode, the fourth sub-area will become said selected sub-area. After the ticker has left the screen, i.e. the last selected sub-area was the n-th sub-area, the system and/or method will switch to an initial state. In the initial state, the first and n-th sub-area will become said selected sub-area. This means, in the initial state, said selected sub-area is equal to the first sub-area and n-th sub-area. By determining the video mode of the first sub-area titles entering said ticker area from right to left will be detected, and by determining the video mode of said n-th sub-area, tickers leaving the ticker area from right to left will be detected, and the video mode will be detected correctly, in particular said local mode will be determined correctly based on said sub-area video mode.

In step II.1 said global video mode may be determined based on a video mode detection algorithm and/or in step II.3.3, said sub-area video mode may also be determined based on said video mode detection algorithm. It is possible that different video mode detection algorithms are used in step II.1 and II.3.3.

In a further embodiment, said derivative of said video input data corresponds to a first measurement value indicating a degree of motion between previous and current video pictures, and said derivative of said sub-area data corresponds to a second measurement value indicating a degree of motion between previous and current video pictures within said sub-areas. Said first measurement value and said second measurement value can be used for determining said global video mode and/or said sub-area video mode.

In a further embodiment, said video mode detection algorithm is based on pixel differences.

Therefore, said first measurement value and/or said second measurement value are calculated based on pixel differences between previous and current video pictures.

In a further embodiment, said video mode detection algorithm is based on a sum of motion vectors.

In this case, said first measurement value and/or said second measurement value are calculated based on a sum of motion vectors for previous and current video pictures.

In a further embodiment, said video mode detection algorithm comprises a decision about a video mode based on a hysteresis, wherein a change of video mode is only determined after the same video mode has been determined for a predetermined number of consecutive video pictures.

In a further embodiment, in step II.3.4, said local video mode is chosen to be equal to said sub-area mode. In other words, said local video mode is then always the same as said sub-area video mode.

In a further embodiment, said ticker area is located in the lower, upper or middle part of said video picture. This may depend on the region where said method for video mode detection is used. If the ticker is generally broadcast in the lower part of said video picture, as is the case in most western countries, said ticker area is e.g. located in the lower part of said video picture.

It is also possible that said ticker area comprises a first picture area on the lower part of said video picture and a second picture area on the upper part of said video picture. This means, it is possible to detect a ticker within the bottom and/or the upper part of the picture at the same time. This means, said ticker area may be split into said first picture area and said second picture area.

Within step II, it is possible to use a state machine for modeling said analyzing of said input video data, wherein each state of said state machine corresponds to one of said n sub-areas and to the step of determining said sub-area video mode.

In this case, a change of state within said state machine may depend on the video mode determined for the previous state corresponding to a previously evaluated sub-area, for which the video mode was determined.

In the following, an example for the application of such a state machine within the framework of the invention is given:

In an initial state e.g. after a channel switch or when switching from TV to DVD video source, the first sub-area and n-th sub-area are observed and the video mode is determined for the first and n-th sub-area. While the video mode for the first and n-th sub-area is equal to film mode, the state machine stays in the initial state, i.e. the video mode for said first and n-th sub-area are continuously determined. If e.g. the video mode switches from film mode to camera mode for said first sub-area, as explained above, the second sub-area will be chosen as selected sub-area and the video mode will be determined for the second sub-area. This corresponds to the second state of said state machine. While the video mode for the second sub-area is equal to camera mode, the system/method stays in the second state. If the video mode for said second sub-area switches from camera mode to film mode, e.g. a ticker has left said second sub-area, the third sub-area corresponding to the third state of said state machine will be processed, i.e. a video mode for said third sub-area will be determined.

The method for motion compensated up-conversion depends on a video mode, wherein said video mode is determined based on a method for video mode detection as defined above.

In a further embodiment, within said method for motion compensated up-conversion, in the following also simply referred to as "up-conversion", a motion compensated up-conversion is performed for said ticker area depending on said local area mode and a motion compensated up-conversion is performed for said remaining area depending on said global video mode. In case a ticker is running through said ticker area, in this embodiment, e.g. camera mode is used for up-conversion within said ticker area and film mode is used for up-conversion within said remaining area.

The signal processing system is capable of performing or realizing a method for video mode detection as defined above and/or a method for motion compensated up-conversion as defined above, and/or the steps thereof, i.e. the steps of said method for video mode detection and/or said method for motion compensated up-conversion.

The computer program product comprises computer program means adapted to perform and/or to realize a method for video mode detection as defined above and/or a method for motion compensated up-conversion as defined above and/or the steps thereof, when it is executed on a computer, a digital signal processing means, and/or the like.

The computer-readable storage medium comprises a computer program product as defined above.

The invention and details thereof will be explained by way of an exemplary embodiment thereof in the following with reference to the accompanying drawings in which FIG. 1 shows a diagram explaining the difference in up-conversion for film mode and camera mode;

Figure 1A:
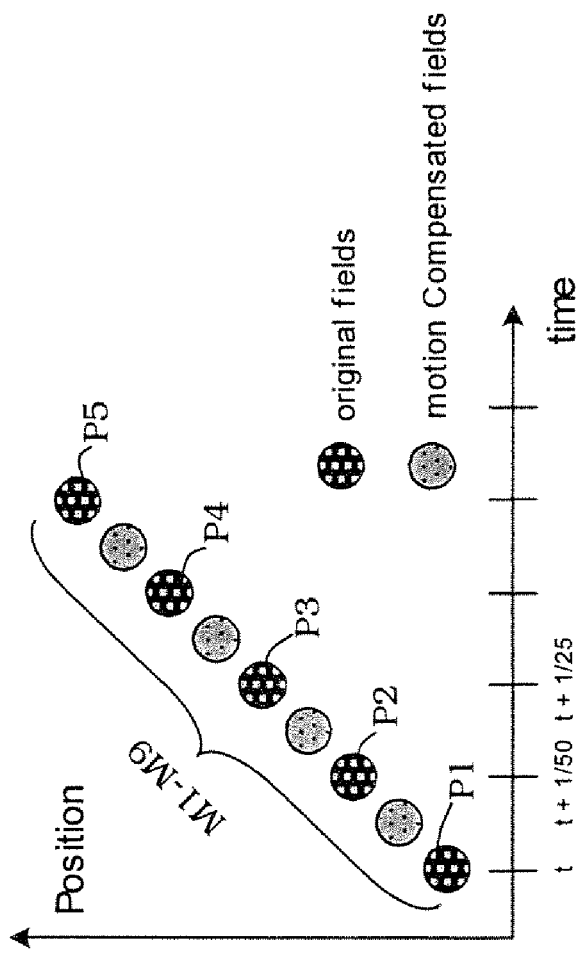
Figure 1B:
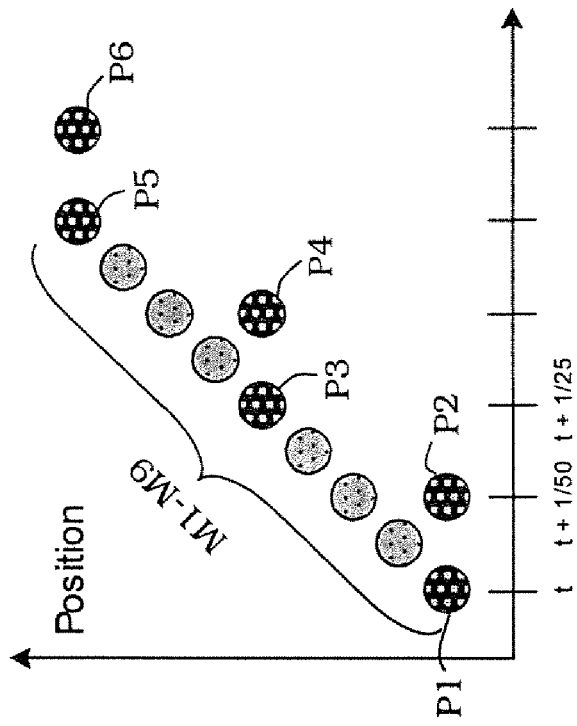

FIGS. 1A and 1B show the two main modes for motion compensated up-conversion. In FIG. 1A the up-conversion for camera mode is shown and in FIG. 1B the up-conversion for film mode is shown. As can be seen when comparing FIG. 1A and FIG. 1B, the up-conversion process is different in both cases. Therefore, if one up-conversion mode is applied to the wrong input material, i.e. the up-conversion mode does not match with the video mode of video input data VID, the up-converted sequence, i.e. a video output VO, will show motion artifacts. In order to select the correct up-conversion mode, the correct video mode must be determined for the video input data VID. This means, the input material, i.e. the video input data VID must be classified based on some analysis data like sum of vectors or picture differences, i.e. based on a video mode detection algorithm that is e.g. based on pixel differences or on a sum of motion vectors.

The input material can be a mixture of film and camera mode. For example, the incoming video sequence, i.e. said video input data VID may be film mode, so the global detection method configures the up-conversion to the appropriate mode, i.e. to film mode. Running titles or tickers T, which are blended in by the broadcaster are, however, usually in camera mode which results in bad quality for this part of the picture, because the up-conversion is done for film mode. The viewer however concentrates on these titles, so the up-conversion system, i.e. the method for motion compensated up-conversion, should run in camera mode in order to render the titles in best possible quality. This can mean a loss of picture quality in the background picture, but this is acceptable for the duration of the running titles. In order to avoid the loss of quality picture in the background, it is also possible to use different up-conversion modes for a ticker area TA and a remaining area RA, wherein said ticker area TA is the area of the screen in which said ticker T is blended in, i.e. displayed, and said remaining area RA corresponds to the rest of the picture (see FIGS. 5 and 7).

In prior art TV sets, in case of mixed mode video input data VID, i.e. camera mode for said ticker area TA and film mode for said remaining area RA, the switching between film mode and camera mode occurs randomly. This means, prior art systems work only with a global film mode/camera mode detection, where the robustness is lowered very much in order to switch to camera mode from film mode very easily. In case of a more reliable performance of prior art systems, such systems stay in camera mode during the period when running titles were visible but the switching to the appropriate camera mode occurred very late. This means, the title detection or ticker detection is not sufficiently accurate in these prior art systems. Summarizing, the available prior art systems are not sufficiently robust and not sufficiently accurate.

The video input data VID consists of a sequence of video pictures P. In FIG. 1A a sequence of pictures P1, ..., P6 is shown (in FIG. 1A displayed as solid balls with white dots). The frequency of the incoming video input data VID is 50 Hz, and must be up-converted to 100 Hz. Therefore, a motion up-converted video output VO is generated, which consists of a sequence of motion compensated video pictures M1-M9. As can be seen in FIG. 1A, the frequency of motion between consecutive video pictures P of said video input data VID is 25 Hz.

In FIG. 1B, the incoming video input data VID is in film mode. The incoming video pictures P1, ..., P5 therefore have a motion frequency of 50 Hz, i.e. there is motion between each consecutive video picture P. The video input data VID, i.e. the sequence of video pictures P1, ..., P5 are subjected to a method for motion compensated up-conversion, wherein in FIG. 1B this method depends on film mode. The video output VO results from processing the sequence of video pictures P1, ..., P5 as a sequence of motion compensated video pictures M1-M9.

In order to enable a correct motion compensated up-conversion, first an accurate detection process is needed, i.e. a robust and reliable method for video detection, and afterwards the switching of the up-conversion system to the correct video mode is necessary that makes the letters of e.g. a ticker run smoothly along the screen, while keeping an acceptable quality on the overall picture. This means, in case a ticker occurs on the screen, the method for motion compensated up-conversion must be switched to camera mode.

Figure 2:
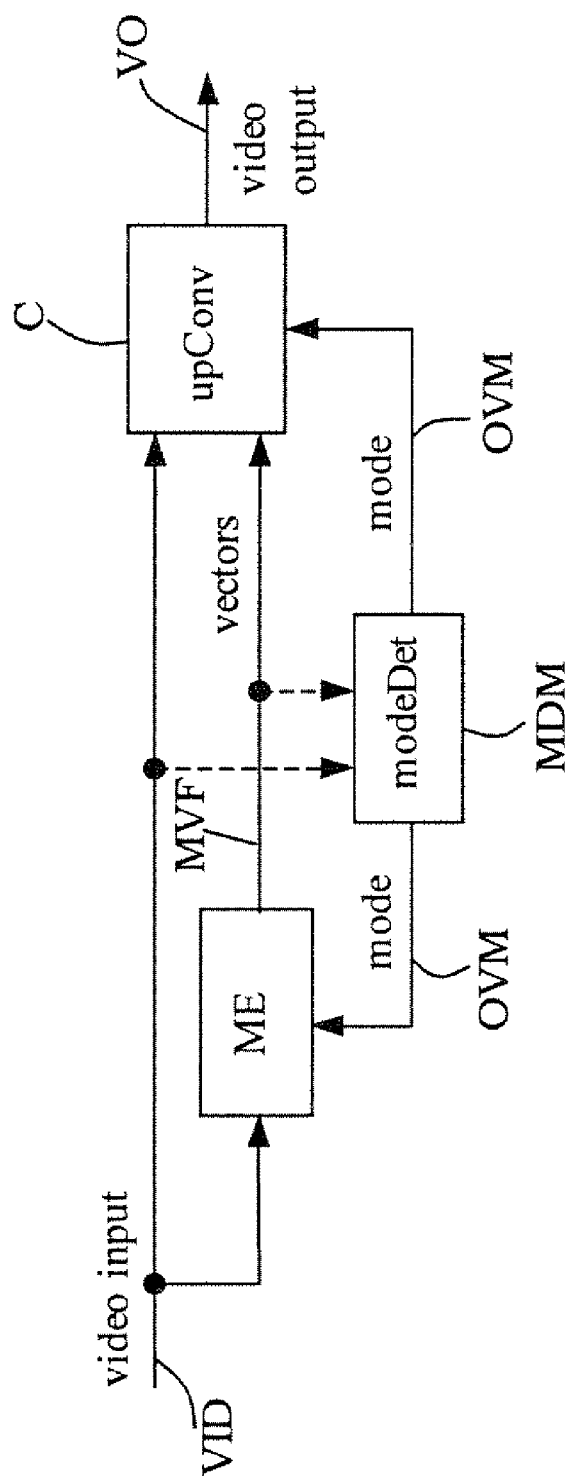
FIG. 2 shows a block diagram illustrating the method for motion compensated up-conversion depending on a video mode of video input data.

FIG. 2 shows a general block diagram of a motion compensated up-conversion system. The motion estimation block ME produces motion vector fields MVF that are delivered to an up-conversion module C. A mode detection module MDM classifies the input video stream, i.e. video input data VID, into camera mode or film mode and its derivates based on e.g. a sum of motion vectors and/or picture differences, i.e. pixel differences, which is depicted with dashed lines in FIG. 2.

As mentioned, said mode detection module MDM determines the video mode of said video input data VID. The determined video mode is an output video mode OVM, which is output by said mode detection module MDM to said up-conversion module C. The up-conversion module C performs the video up-conversion, i.e. a method for motion compensated up-conversion depending on said output video mode OVM. The up-conversion within said up-conversion module C is performed for said video input data VID based on said motion vector fields MVF and said output video mode OVM. The output of said up-conversion module C is video output VO, i.e. motion compensated video output data.

In FIG. 2, said video input data VID corresponds to the sequence of video pictures P1, ..., P6 in FIGS. 1A and 1B, and the video output VO corresponds to the motion compensated sequence of video pictures M1-M9 in FIGS. 1A and 1B.

In the following, the steps performed within the mode detection module MDM will be described at hand of FIG. 3.

Figure 3:
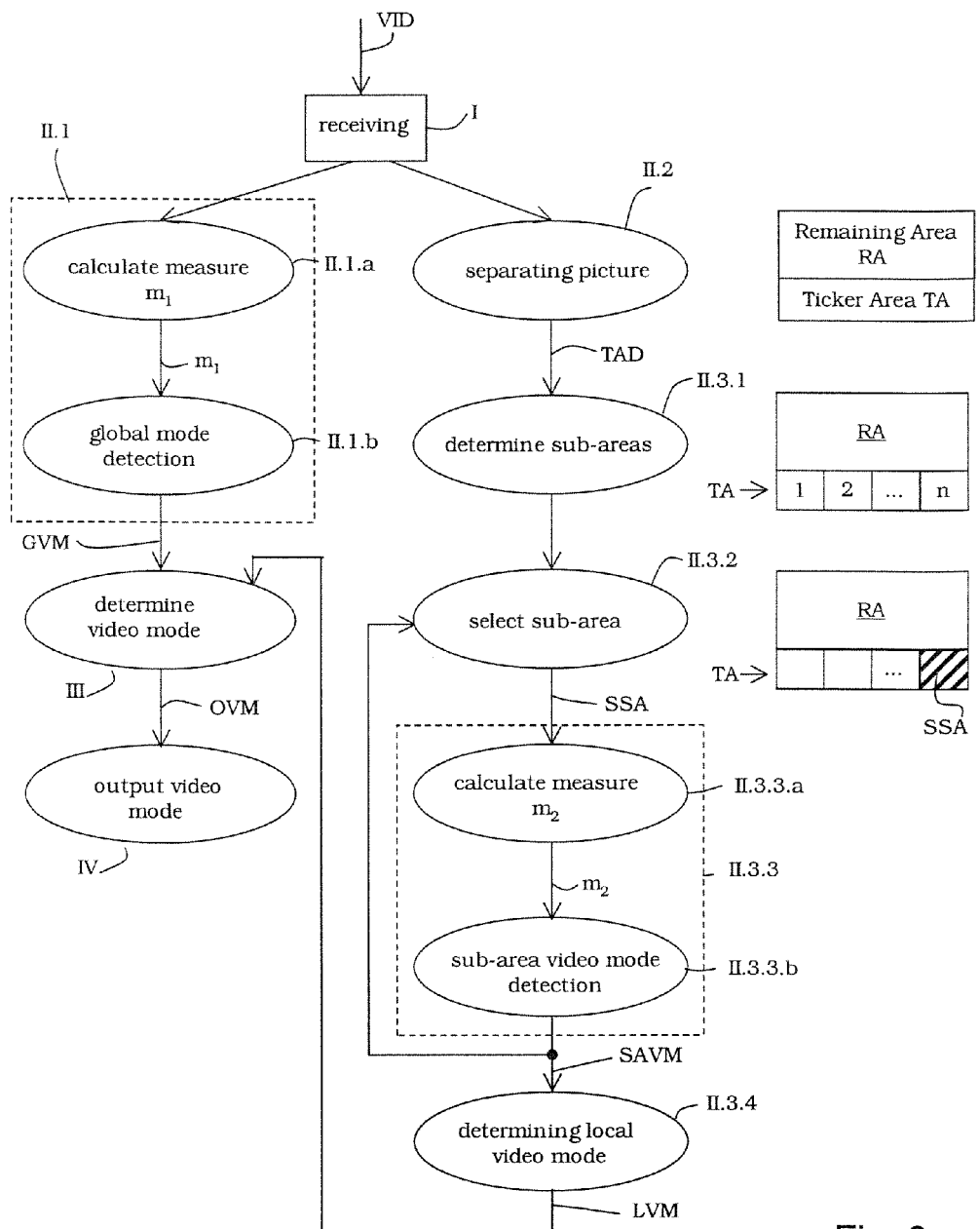
FIG. 3 shows a block diagram with different steps according to the invention.

In FIG. 3, video input data VID is received in a receiving step I. In step II.1, a global video mode GVM is determined for said video input data VID (see left branch in FIG. 3). Within step II.1.a, a first measurement value $m_1$ is determined, i.e. a derivative of the video input data VID is determined. Said first measurement value m1 can be calculated based on pixel differences between previous and current video pictures from said sequence of video pictures P1, ..., P6 based on a sum of motion vectors. In the embodiment considered here, said first measurement value $m_1$ is calculated based on a sum of motion vectors. Said first measurement value $m_1$ is then used for global mode detection in a global mode detection step II.1.b. The result is a global video mode GVM for the whole video picture P of said video input data VID.

In parallel to determining said global video mode GVM, a local video mode LVM is determined from said video input data VID (see right branch in FIG. 3). Therefore, in a subdividing step II.2, the video picture of said video input data VID is subdivided into a ticker area TA and a remaining area RA. Said ticker area TA may e.g. correspond to the 50 bottom lines of said video picture P. However, it is also possible that said ticker area TA is located on the top of said video picture P or in the middle. It is also possible that said ticker area TA is split into different areas of said video picture P, e.g. a part of said ticker area TA may be located at the bottom of said video picture P and a part in the upper area of said video picture P.

Said ticker area TA corresponds to ticker area data TAD, i.e. video data that corresponds to said ticker area TA. These ticker area data TAD are used in a sub-area determining step II.3.1. In said sub-area determining step II.3.1 said ticker area TA is subdivided into n sub-areas 1, ..., n, where n is an integer value and greater or equal to two. In one embodiment, n is equal to 6, i.e. n=6.

Subsequently, in a sub-area selection step II.3.2, one of said sub-areas 1, ..., n is selected as selected sub-area SSA. Said selected sub-area SSA may comprise two sub-areas of said sub-areas 1, ..., n. In an initial state, said selected sub-area SSA corresponds to the first and n-th sub-area of sub-areas 1, ..., n. In said initial state, thus, the right bottom corner and the left bottom corner of said video picture P is observed for an incoming ticker that is moving from right to left within said ticker area and/or an outgoing ticker leaving said ticker area from right to left.

In a second measurement value calculating step II.3.3.a, a second measurement value $m_2$ is calculated for said selected sub-area SSA. This means, the video data corresponding to said selected sub-area SSA is evaluated and said second measurement value $m_2$ is calculated for this data. Said second measurement value $m_2$ may be calculated on the basis of pixel differences within said selected sub-area SSA or on the basis a sum of motion vectors within said selected sub-area SSA.

Said second measurement value $m_2$ is then used in a sub-area mode detection step II.3.3.b, wherein the video mode is determined for said selected sub-area SSA as sub-area video mode SAVM. The sub-area video mode SAVM corresponds to the video mode of said selected sub-area SSA.

Then, in a local mode detection step II.3.4, said local video mode LVM is determined for said ticker area TA. In the embodiment considered here, said local video mode LVM is set to be equal to said sub-area video mode SAVM. However, generally this does not need to be the case, because it may also be possible that said local video mode LVM depends on said sub-area video mode SAVM and the video mode of other areas within said ticker area TA, i.e. of the video mode of other sub-areas.

Finally, in an output video mode detection step III, said global video mode GVM and said local video mode LVM are used in order to determine an output video mode OVM. In the embodiment considered here, said output video mode OVM is set equal to said local video mode LVM. However, generally, this does not need to be the case, because it is possible that said output video mode OVM is also determined by other factors.

Then, in an outputting step IV, said output video step OVM is output for further processing, i.e. for the use within said up-conversion module C.

As can be seen in FIG. 3, the selection of said sub-area within said sub-area selection step II.3.2 depends on said sub-area video mode SAVM of a previous video picture P. For example, in FIG. 1A a different selected sub-area SA may be used for determining a video mode of the first video picture P1 and the second video picture P2. Thereby, the selected sub-area SSA of the second video picture P2 depends on the sub-area video mode SAVM of selected sub-area SSA for determining the video mode of video picture P1. In other words, the presented method comprises an iterative process, wherein different selected sub-areas SSA are selected depending on the video mode of a selected sub-area SSA of a previous video picture P.

Figure 4:
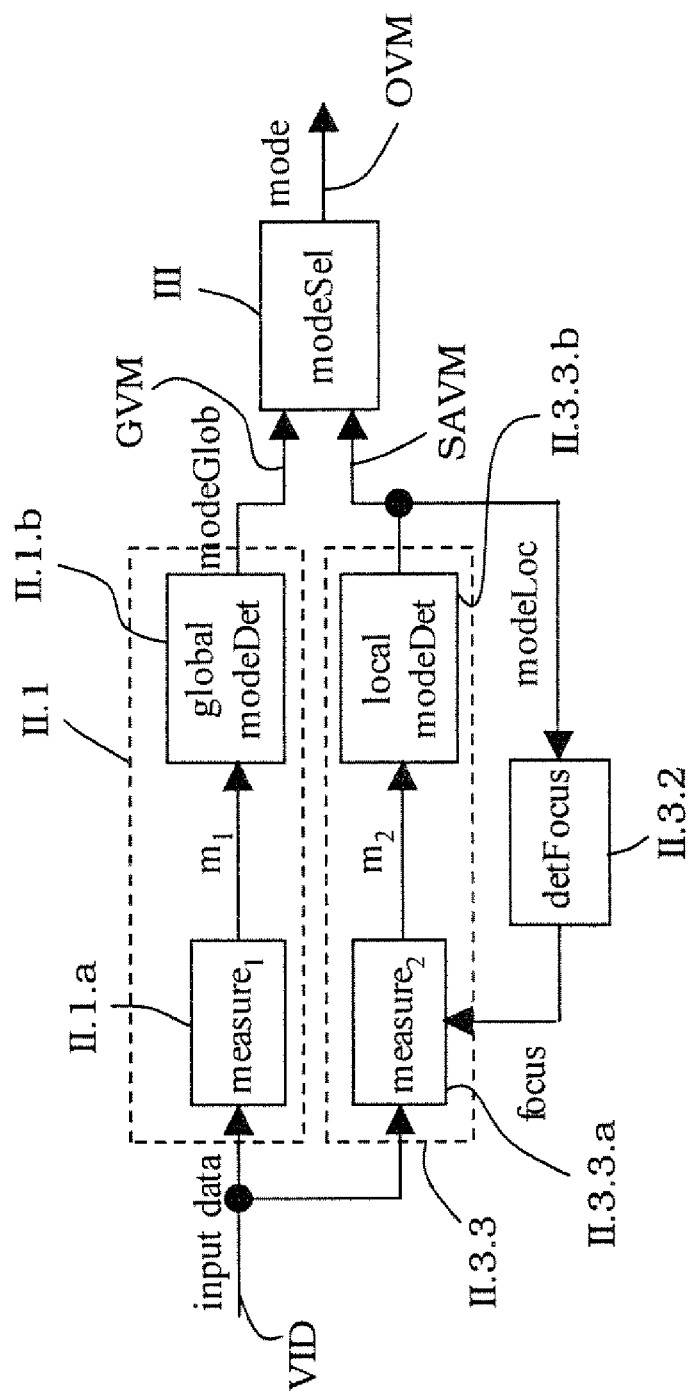
FIG. 4 shows a block diagram for explaining a method for video mode detection according to the invention.

FIG. 4 shows a further block diagram for explaining how the output video mode OVM is determined from said video input data VID. As can be seen in the upper branch of FIG. 4, first, said first measurement value calculation step II.1.*a* is thereby performed, calculating said first measurement value $m_1$. Said first measurement value $m_1$ is used within said global mode detection step II.1.*b* for determining said global video mode GVM.

In the lower branch, within said second measurement value calculating step II.3.3.*a,* said second measurement value $m_2$ is calculated from said video input data VID. Said second measurement value $m_2$ is used within said sub-area mode detection step II.3.3.*b* for determining said sub-area video mode. As can be seen, within said second measurement value calculating step II.3.3.*a,* said second measurement value $m_2$ is calculated depending on a focus. Said focus corresponds to a selected sub-area SSA and is determined within said sub-area selection step II.3.2 that may also be referred to as focus determining step. As can be seen, said focus determining step is determining said focus depending on said sub-area video mode SAVM.

In other words, within FIG. 4, the incoming data i.e. said video input data VID, which can be video and/or vector data (in the example considered here it is only vector data), is passed to a measurement block measure$_1$ and measure$_2$, which deliver the analysis data $m_1$ and $m_2$. Within said measurement blocks, said first measurement value $m_1$ and said second measurement value $m_2$ are calculated. Said first measurement value $m_1$ and said second measurement value $m_2$ are fed into mode detection modules. The first mode detection module corresponding to said global mode detection step II.1.*b* classifies the global mode of the video stream, the second module, corresponding to said sub-area mode detection step II.3.3.*b,* classifies the mode on a limit area, where the running title, i.e. ticker, is expected to appear. Both mode detection modules pass their results modeGlob and modeLoc, i.e. said global video mode GVM and said sub-area video mode SAVM, to a mode selector modeSel, which generates the final output to the system. In order to improve the accuracy and to reduce the computational effort, the local mode detection is able to change its focus, where it does the actual detection. This area of interest corresponding to said selected sub-area SSA is determined in a focus determining module detFocus and delivers the region size to the measure$_2$-module as a list of parameters focus. In this way, the local mode detection is tracking the running title, especially if it is leaving the visible area of the video sequence, i.e. a ticker is leaving the screen on the left side.

In the embodiment described here, the module measure$_2$ acquires data only on the lower part of the picture due to the experience that running titles are always displayed in this area. The area was mainly limited to save computational cost, because of the software implementation on a digital signal processor with limited CPU power. Of course, this can be extended to the compete picture area.

The changeable focus of the local mode detection has the following effects:
1. Initial appearance: The letters of a ticker must be detected immediately to avoid the juddering or at least make it so short that the viewer does not realize the artifact. In other words, the ticker detection must be very fast.
2. Location of the running title: Ensuring an accurate decision on the local mode implies to only use data, which contains information of the running title. On the other hand, it is important to keep this data small to make a good use of the available resources, i.e. to keep the CPU load small. For instance, it is inadequate to use data from the left side of the screen, in case the running title did not yet reach this point.
3. Resume of the sequence: If the sequence containing the letters was paused and afterwards resumed or the viewer switched from a TV-channel to another, presenting the running title, the system would not know the exact location of the letters on the screen or even that there exists such an event.
4. Reduction of CPU load: As already mentioned, the invention comprises a software implementation on a digital signal processor DSP, i.e. said method for video mode detection must be very efficient in order to be able to be processed by a digital signal processor, and it is therefore necessary to save computational complexity as much as possible. The limitation of the focus is beneficial for this purpose, because less data is accessed and accumulated in the module measure$_2$, corresponding to said second measurement value calculating step II.3.3.*a.*

Within said second measurement value calculating step II.3.3.*a,* i.e. within said module measure$_2$, incoming data is only acquired in the respective focus i.e. respective selected sub-area SSA, and said second measurement value $m_2$ for the local mode detection is only calculated for said focus, i.e. the focus area, that corresponds to said selected sub-area SSA. In order to properly decide which data subset must be processed, i.e. which of said sub-areas 1, . . . , n will be used as selected sub-area SSA, a state machine SM with n states is used. In the following example, n is equal to six.

Figure 5:
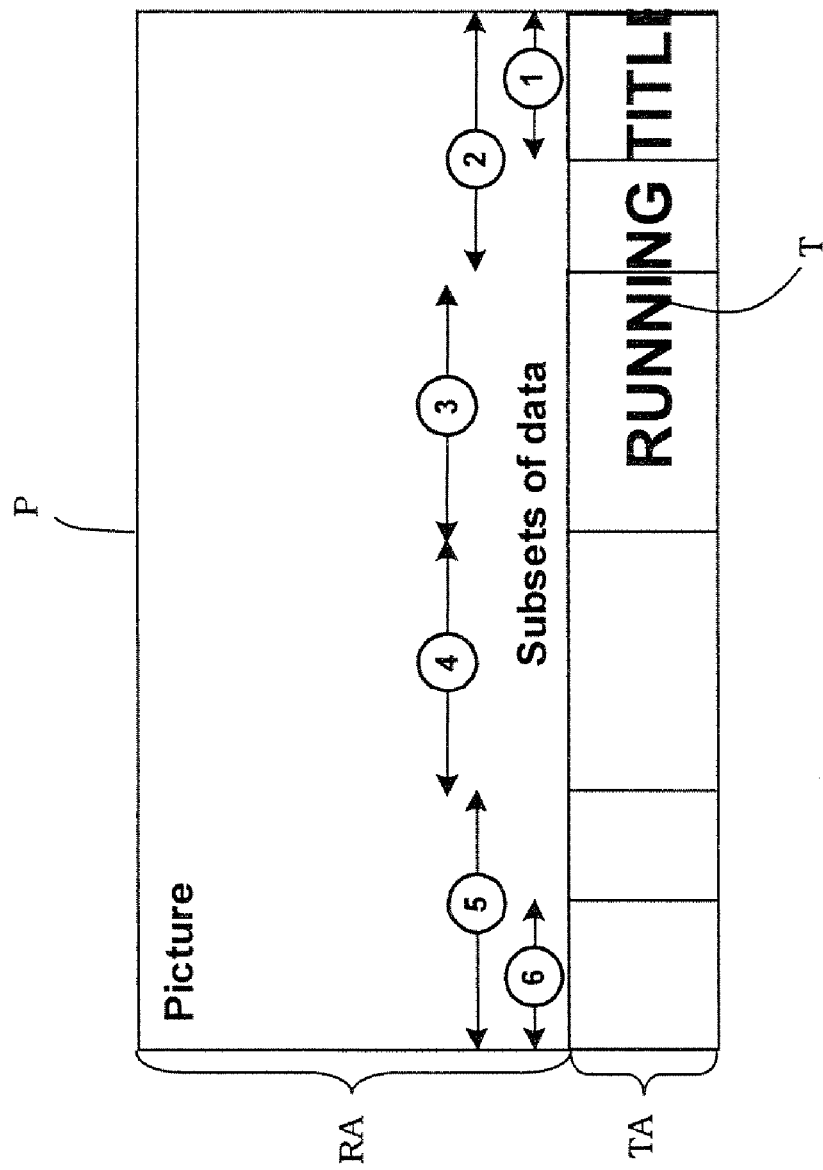
FIG. 5 shows a video picture with a ticker area that contains different sub-areas, wherein a ticker is entering the ticker area.
Figure 6:
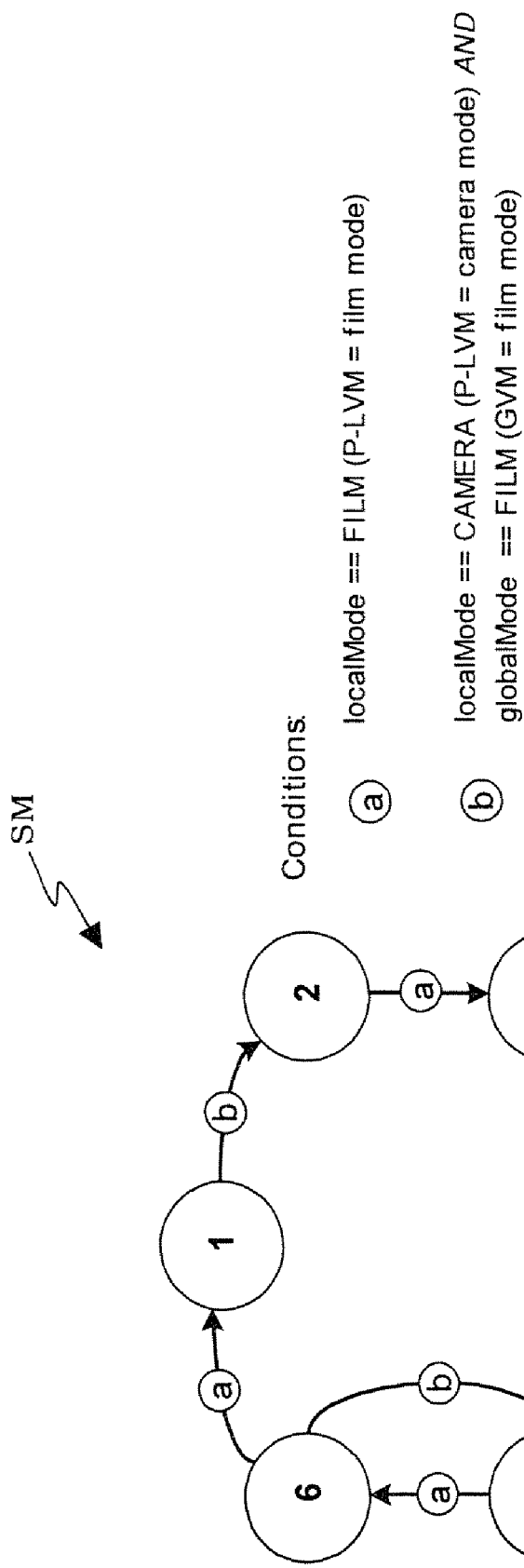
FIG. 6 shows a state machine used for the description of the different steps of the invention.
Figure 7:
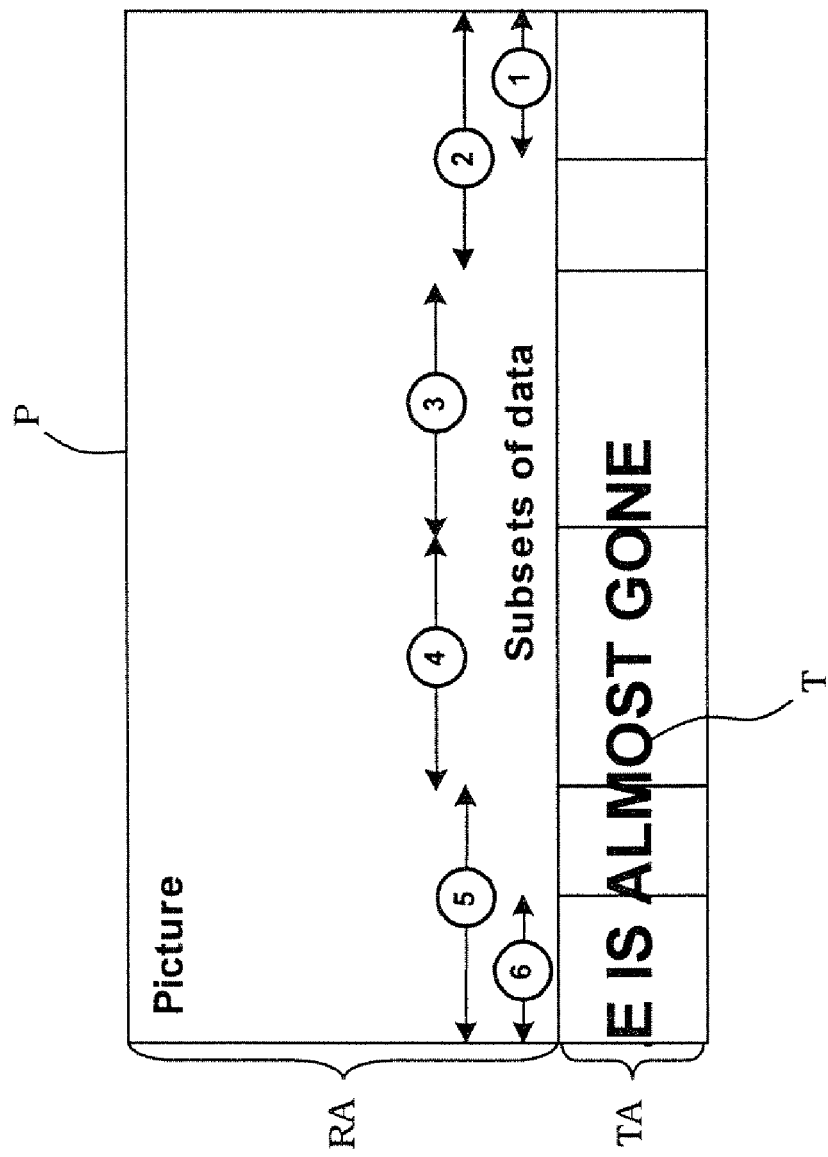
FIG. 7 shows the video picture of FIG. 5 with the ticker area that contains different sub-areas, wherein a ticker is leaving the ticker area.

The state machine SM is implemented in the module detFocus, corresponding to said sub-area selection step II.3.2, and has six states as depicted in FIG. 6. Each state 1, . . . , 6 of said state machine SM corresponds to a focus block, i.e. to one sub-area of the sub-areas 1, ..., 6 that are shown in FIGS. 5 and 7.

This means, each state of said state machine SM corresponds to the detection of the video mode of a sub-area of said sub-areas 1, ..., 6.

For explaining the functioning of the state machine SM in connection with the processing of the different sub-areas, firstly, the general case, when running titles appear at the right side of the screen, will be explained. The system initially resides in the first state 1 and waits for the appearance of the running title. The set of data, i.e. the video data of the first sub-area 1 is smaller than the sub-areas 2, 3, 4, and 5, because the goal is to restrict the area containing information that truly represent the running title and thus avoiding that other data computes negatively to the local film/camera detection. This approach allows overcoming the first critical situation with the initial appearance of the running title. Once the running title, i.e. ticker, is detected, this system jumps to the second state 2 and processes a bigger area, i.e. the second sub-area 2, which is expected to be filled with letters of said ticker and therefore an accurate decision on the local mode will be made. The size of the area is a trade-off between CPU load and robustness of the method.

The system will stay on the second state 2 until the title starts disappearing since, as shown in FIG. 5, the letters will fill the corresponding area and therefore, the local detector will always decide on camera mode.

Within said mode detection modeDet, corresponding to said global mode detection step II.1.*b* and said sub-area mode detection step II.3.3.*b*, the robustness of the system is further improved and toggling between camera mode and film mode is avoided due to a built-in hysteresis. This means, there must be a number of decisions for a sequence of video pictures in favor of one or another mode before the detection result is changed. This length of the hysteresis is a trade-off between switching time to the new mode (low value) and robustness (high value).

Once the mode detector decided on film mode, i.e. within said sub-area mode detection step II.3.3.*b*, the video mode of the selected sub-area SSA is determined to be film mode, the system hops to the next state, i.e. to the third state 3. This means, the third area within the video picture P shown in FIGS. 5 and 7 will become said selected sub-area SSA and the video mode will be determined for the third sub-area 3. At this point, the local detector will again detect camera mode, since the whole set of data contains only letters, as can be seen in FIG. 5.

The system will behave in an analogue way for the following states 4 and 5, i.e. said selected sub-area SSA will become the fourth sub-area 4 and the fifth sub-area 5.

The last state, i.e. the sixth state 6, has a similar approach as the initial one, since juddering is avoided for a running title when only a few letters remain on the screen. When the letters are gone, the film/camera detector will make decisions against the camera mode, thus jumping again to the first state 1.

At this point, the first two critical situations are solved, but the third one is not covered. As explained above, if the viewer changes the channel and the running title is already on the screen and disappearing, the system will not detect this event, since the system may be waiting in the first state corresponding to the first sub-area. This is illustrated in FIG. 7. Showing the possible situation after the viewer has changed the TV-channel or the input source material, e.g. from TV to DVD.

Therefore, if the system resides in the first state 1, the sixth state 6 becomes also active and the mode detector also checks the local mode for this area, i.e. said selected sub-area SSA corresponds to the first sub-area 1 and the sixth sub-area 6.

It is important to note that the sixth state 6 has a double functionality, i.e. to track the running title until it is completely gone and check the critical situations like those mentioned in point 3 above. The two cases must be differentiated, since the first one must produce a hop to the first state 1 where the second case results in a jump to the fifth state 5 in order to process a bigger area, thus making a more reliable decision on the local mode.

In other words, when the system is in said initial state, the first sub-area 1 and the sixth sub-area 6 are both observed and the video mode is determined for this area.

In case the video mode of a previous video picture P was camera mode and the global mode is film mode, the system goes to the second state 2. The system stays in state 2 as long as the video mode for the second sub-area 2 corresponds to camera mode. When the mode switches from camera mode to film mode for the second sub-area 2, the system switches to the third state 3. This behavior continues until the sixth state 6, i.e. the ticker is tracked by the different states. A condition a for the transition from state 2 to 3, 3 to 4, 4 to 5, 5 to 6, 6 to 1, is therefore set. The condition a is that local mode for the previous state switches from camera mode to film mode. For example, the condition for transition from state 2 to state 3 is that the video mode for the second sub-area 2 switches from camera mode to film mode.

The condition b for transition between state 1 to state 2 and state 6 to state 5 is that the local mode of a previous video picture P is camera mode and the global mode is film mode. Thus, from the left side of said ticker area TA and from the right side of said ticker area TA at first a relatively small area is processed and a corresponding sub-area video mode SAVM is determined, and in case the corresponding sub-area video mode SAVM is camera mode, then a bigger area corresponding to sub-area 2 and sub-area 5 is processed.

It is possible that local video mode LVM be changed from film mode to camera mode in state 1 and state 6. However, it is also possible that the local video mode LVM is chosen to be film mode in state 1 and state 6, although the detected video mode for the first sub-area 1 and the sixth sub-area 6 was determined to be camera mode. The local video mode LVM is only changed from film mode to camera mode in case the video mode for the second sub-area 2 and/or the fifth sub-area 5 is also camera mode. This means, the local video mode LVM is only changed from film mode to camera mode in case for two states, i.e. in the first and second state or in the sixth and fifth state, the sub-area video mode SAVM was determined to be camera mode.

The modeSel module in FIG. 4 corresponding to said output video mode detection step III, is responsible for deciding on the final mode in which the input material will be processed, i.e. in film mode or camera mode. Said output video mode detection step III therefore comprises a global and a local decision. If the global mode detects camera mode, the local decision is not taken into consideration, but if the global mode returns film mode, the local mode must be checked.

In this case, if the local mode is also film mode, up-conversion will be realized in this mode, i.e. in film mode, but if local mode is camera mode, the global mode must be corrected to camera mode, in order to make a fine and/or proper up-conversion of the running title.

REFERENCE LIST

1, ..., 6 $1^{st}$, ..., $6^{th}$ sub-area
C up-conversion module
GVM global video mode
I receiving step
II.1.a first measurement value calculating step
II.1.b global mode detection step
II.2 subdividing step
II.3.1 sub-area determining step
II.3.2 sub-area selection step
II.3.3.a second measurement value calculating step
II.3.3.b sub-area mode detection step
II.3.4 local mode detection step
III output video mode detection step
IV outputting step
LVM local video mode
$m_1$ first measurement value, derivative of video input data
M1, ..., Mx motion compensated up-converted video pictures
$m_2$ second measurement value, derivative of sub-area data
MDM mode detection module
MVF motion vector fields
OVM output video mode
P video picture
P1, ..., Px consecutive video pictures
P-LVM previous local video mode
P-SVM previous sub-area video mode
RA remaining area
SAD sub-area data
SM state machine
SSA selected sub-area
SVM sub-area video mode
T ticker
TA ticker area
TAD ticker area data
VID video input data
VO video output

The invention claimed is:

1. A method for video mode detection, comprising:
dividing a video image of video input data into a ticker area and a remaining area;
determining a local video mode for the ticker area by
subdividing said ticker area into n sub-areas, where n is an integer value and greater or equal to two;
selecting at least one of said n sub-areas as a selected sub-area;
determining a sub-area video mode for said selected sub-area based on a derivative of sub-area data corresponding to the selected sub-area, said derivative of said sub-area data corresponding to a second measurement value indicating a degree of motion between previous and current video images within said sub-areas; and
determining said local video mode for said ticker area based on said sub-area video mode.

2. The method according to claim 1, further comprising analyzing said video image, thereby determining a video mode of said video image, wherein said video mode is determined depending on said local video mode and a global video mode of said video image, wherein said global video mode for said video image is determined based on said video image or a derivative thereof.

3. The method according to claim 1, wherein, when selecting at least one of said n sub-areas, said selected sub-area is selected depending on a previous local video mode, which corresponds to the local video mode of a previous video image.

4. The method according to claim 1, wherein, when selecting at least one of said n sub-areas, said selected sub-area is selected depending on a previous sub-area video mode, which corresponds to the sub-area video mode of a previous video image.

5. The method according to claim 1, wherein a first sub-area and an n-th sub-area of said n sub-areas are chosen to be smaller than a remaining n-2 sub-areas, wherein said first sub-area is located on the right side of said ticker area and said n-th sub-area is located on the left side.

6. The method according to claim 5, wherein
n is greater or equal to four,
said first sub-area is completely contained in a second sub-area of said n sub-areas, and
said n-th sub-area is completely contained in an (n-1)-th sub-area.

7. The method according to claim 5, wherein, when selecting at least one of said n sub-areas, said first sub-area and said n-th sub-area are selected as selected sub-area, such that a ticker running through said video image is detected when just entering said video image from a right side or when leaving the video image on a left side.

8. The method according to claim 5, wherein
a second sub-area is chosen as selected sub-area in case a previous first sub-area video mode for a first sub-area was a camera mode,
wherein said previous first sub-area video mode corresponds to the sub-area video mode of a previous video image within said first sub-area.

9. The method according to claim 8, wherein
when said first sub-area is said selected sub-area and said sub-area video mode is determined to be camera mode, then said local video mode is chosen to be film mode, and
said second sub-area is chosen to be said selected sub-area and a corresponding sub-area video mode is determined,
wherein when said corresponding sub-area video mode is camera mode, said local video mode is chosen to be camera mode,
otherwise said local video mode is chosen to be film mode.

10. The method according to claim 1, wherein an (n-1)-th sub-area is chosen as selected sub-area when a previous n-th sub-area video mode for an n-th sub-area was camera mode, wherein said previous n-th sub-area video mode corresponds to a sub-area video mode of a previous video image within said n-th sub-area.

11. The method according to claim 10, wherein
when the n-th sub-area is said selected sub-area and said sub-area video mode is determined to be camera mode, then said local video mode is chosen to be film mode, and
said (n-1)-th sub-area is chosen to be said selected sub-area and a corresponding sub-area video mode is determined,
wherein when said corresponding sub-area video mode is camera mode, said local video mode is chosen to be camera mode,
otherwise said local video mode is chosen to be film mode.

12. The method according to claim 1, wherein
a second to (n-1)-th sub-areas are non-overlapping areas of said ticker area, and
an m-th sub-area, where $3 \leq m \leq n$ is selected as said selected sub-area, when a previous (m-1)-th sub-area video mode for an (m-1)-th sub-area was film mode, wherein said previous (m-1)-th sub-area video mode corresponds to the sub-area video mode of said (m-1)-th sub-area of a previous video image.

13. The method according to claim 2, wherein
when determining said global video mode for said video image, said global video mode is determined based on a video mode detection algorithm, and
when determining a sub-area video mode for said selected sub-area, said sub-area video mode is determined based on said video mode detection algorithm.

14. The method according to claim 2, wherein
said derivative of said video image corresponds to a first measurement value indicating a degree of motion between previous and current video images.

15. The method according to claim 14, wherein said first measurement value and said second measurement value are calculated based on pixel differences between previous and current video images.

16. The method according to claim 13, wherein said video mode detection algorithm is based on a sum of motion vectors.

17. The method according to claim 14, wherein said first measurement value and said second measurement value are calculated based on a sum of motion vectors for previous and current video images.

18. The method according to claim 13, wherein said video mode detection algorithm comprises a decision about a video mode based on a hysteresis, wherein a change of video mode is only determined after a same video mode has been determined for a predetermined number of consecutive video images.

19. The method according to claim 1, wherein, when determining said local video mode for said ticker area, said local video mode is chosen to be said sub-area video mode.

20. The method according to claim 1, wherein said ticker area is located in the lower, upper or middle part of said video image.

21. The method according to claim 1, wherein said ticker area comprises a first picture area on the lower part of said video image and a second picture area on the upper part of said video image.

22. The method according to claim 2, wherein a state machine is used for modeling said analyzing of said video input picture, wherein each state of said state machine corresponds to one of said n sub-areas and to determining said sub-area video mode.

23. The method according to claim 22, wherein a change of state within said state machine depends on a video mode determined within a previous state.

24. A method for motion compensated up-conversion depending on a video mode, wherein said video mode is determined based on a method for video mode detection as defined in claim 2.

25. The method according to claim 24, wherein a motion compensated up-conversion is performed for said ticker area depending on said local video mode, and a motion compensated up-conversion is performed for a remaining area of said video input picture depending on said global video mode, wherein said remaining area does not comprise said ticker area.

26. A signal processing system,
which performs or realizes a method for video mode detection or a method for motion compensated up-conversion according to claim 1 or 24.

27. A non-transitory computer-readable storage medium storing computer-readable instructions, that, when executed by a computer, cause the computer to perform a method for video mode detection or a method for motion compensated up-conversion according to claim 1 or 24.

28. A method for video mode detection, comprising:
dividing a video image of video input data into a ticker area and a remaining area;
determining a local video mode for the ticker area by
subdividing said ticker area into n sub-areas, where n is an integer value and greater or equal to two;
selecting at least one of said n sub-areas as a selected sub-area;
determining a sub-area video mode for said selected sub-area based on sub-area data corresponding to the selected sub-area or a derivative of the sub-area data; and
determining said local video mode for said ticker area based on said sub-area video mode; and
analyzing said video image, thereby determining a video mode of said video image, wherein
said video mode is determined depending on said local video mode and a global video mode of said video image,
said global video mode for said video image is determined based on said video image or a derivative thereof,
the global video mode being determined based on a video mode detection algorithm,
said sub-area video mode for said selected sub-area is determined based on said video mode detection algorithm, and
said video mode detection algorithm being based on pixel differences.

* * * * *